United States Patent [19]
Joullié et al.

[11] 3,892,852

[45] July 1, 1975

[54] PHARMACEUTICAL COMPOSITIONS CONTAINING CYSTEINE DERIVATIVES

[75] Inventors: Maurice Joullié, Yvelines; Lucien Lakah, Paris; Gabriel Maillard, Paris; Pierre Muller, Paris, all of France

[73] Assignee: Recherches Pharmaceutiques et Scientifiques, France

[22] Filed: June 7, 1973

[21] Appl. No.: 367,827

[30] Foreign Application Priority Data
June 15, 1972 France .............................. 72.21606

[52] U.S. Cl........... 424/180; 260/112.5; 260/481 R; 424/319
[51] Int. Cl.² ............................................ A01N 9/00
[58] Field of Search ............................ 424/180, 319

[56] References Cited
UNITED STATES PATENTS

| | | | |
|---|---|---|---|
| 2,888,380 | 5/1959 | Brown et al. ........................ | 167/65 |
| 2,954,315 | 9/1960 | Gordon et al. ...................... | 167/22 |
| 3,624,143 | 11/1971 | Yingshen et al. ................... | 260/516 |

*Primary Examiner*—Elbert L. Roberts
*Attorney, Agent, or Firm*—Armstrong, Nikaido & Wegner

[57] ABSTRACT

The L forms of certain S-substituted cysteines are shown to be active in reducing atheromatous deposits and hypercholesterolemia in test animals and are proposed for use in treatment of similar conditions in human beings. The following cysteines are used: S-(3-hydroxypropyl)-cysteine, S-allylcysteine, S-allylcysteine sulphoxide, S-allyl-N-formylcysteine, S-allyl-N-acetyl-cysteine S-(propen-1-yl)cysteine, S-(buten-2-yl)cysteine, S-propargylcysteine, S-(buten-2-yl)cysteine, S-benzylcysteine and S-(parachlorobenzyl)cysteine. The L cysteines are conveniently used admixed with a pharmacologically acceptable diluent and/or excipient. Patients may be given 200 mg to 3.0 g per day thereof.

7 Claims, No Drawings

PHARMACEUTICAL COMPOSITIONS CONTAINING CYSTEINE DERIVATIVES

This invention relates to the application in human and veterinary medicine of cysteine derivatives which carry a substituent on the sulphur atom.

It has been found that these derivatives of cysteine may be used for treating numerous complaints such as: elastosis, elastorrhexia, collagenosis, degenerative arthropathy, arthrosis, arthritis, atheromatosis and arteriosclerosis.

Furthermore, the reduction in the cholesterol concentration in blood encountered in batches of animals which have been treated with these derivatives gives proof of activity against hypercholesterolemia.

The present invention provides a pharmaceutical found: which 9.31 an 9.43 selected from L S-(3-hydroxypropyl)cysteine, L S-allyl cysteine, L S-allyl cysteine sulphoxide, L S-allyl-N-formylcysteine, L S-allyl-N-acetyl-cysteine, L S-(propen-1-yl)cysteine, L S-(buten-2-yl)cysteine, L S-propargyl cysteine, L S-methylcysteine, L S-ethylcysteine, L S-benzylcysteine and L S-(para-chlorobenzyl)cysteine and a pharmacologically acceptable diluent and/or excipient.

The S-substituted derivatives of cysteine may be used alone or together with substances which are themselves active against hypercholesterolemia, such as derivatives of 2-(p-chlorophenoxy)-2,2-dimethylacetic acid and 3-benzylidenebutyric acid or nicotinic acid.

It has been found that the following derivatives, all of which are of the L series, are active when used in medicine:

β-(3-hydroxypropylthio)α-aminopropanoic acid or S-(3-hydroxypropyl)cysteine,

β-(propen-2-ylthio)α-aminopropanoic acid or S-allylcysteine. S-allylcysteine sulphoxide, β-(propen-2-ylthio)α-formamidopropanoic acid or S-allyl-N-formylcysteine, β-(propen-2-ylthio)α-acetamidopropanoic acid or S-allyl-N-acetylcysteine, β-(propen-1-ylthio)α-aminopropanoic acid or S-(propen-1-yl)cysteine, β-(buten-2-ylthio)α-aminopropanoic acid or S-(2-butenyl)cysteine, β-(propyn-2-ylthio)α-amino propanoic acid or S-propargylcysteine, S-methylcysteine, S-ethylcysteine, S-benzylcysteine and β-(p-chlorobenzylthio)α-aminopropanoic acid or S-(p-chlorobenzyl)cysteine.

The following preparations illustrate the production of the compounds named above. TLC signifies thin layer chromatography.

PREPARATION 1:

L β(3-hydroxypropylthio)α-aminopropanoic acid or L-S-(3-hydroxypropyl)cysteine (LJ 554).

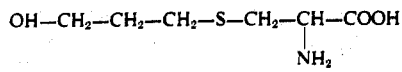

To 500 ml of liquid ammonia cooled to −80°C are added 17.55 g (0.1 mole) of cysteine hydrochloride monohydrate and 6.9 g (0.3 gram atom) of sodium. After the metal has dissolved, 9.5 g of redistilled propane-1,3-diol monochlorohydrin is added.

The reaction mixture shows a negative thiol reaction only after 12 hours.

The ammonia is removed by evaporation, ultimately under reduced pressure. The residue is dissolved in 100 ml of iced water, is thrice extracted with diethyl ether and the pH of the aqueous solution is then brought to 6.1 using 4 N hydrochloric acid. The solution obtained is passed through a column of 400 ml of "Dowex 50" which has previously been activated with 10% hydrochloric acid. When no chloride ions are present in the effluent the product is eluted with 4N ammonium hydroxide, the solution is evaporated to dryness under reduced pressure and the residue dissolved in the minimum amount of water and treated with "Norit" decolorising carbon. After filtering the solution is again evaporated to dryness. 12.30 g (yield = 70%) of product are obtained. M.pt. = 203°C (Buchi). Rotation $(\alpha)_D^{22} = -20.7°$ (5 percent solution in water).

Analysis

The calculated and found values for $C_6H_{13}O_3NS$ are:

C % calculated 40.20; found: 40.26
H % calculated 7.31; found: 7.43
N % calculated 7.81; found: 7.75
S % calculated 17.89; found: 17.57

Thin-layer chromatography (TLC) shows that the product gives only one spot: $R_f = 0.43$, the solvent being a 70/10/20/ mixture of propanol, ammonia and water.

PREPARATION 2:

L β-(propen-2-ylthio)α-aminopropanoic acid or L-S-(propen-2-yl)cysteine or S-allylcysteine (LJ84).

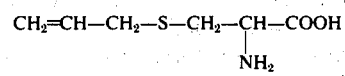

First Method 1800 ml of liquidified ammonia and then 175.5 g (1 mole) of cysteine hydrochloride monohydrate are poured into a flask which is equipped with a stirrer, a bromine funnel and potash guard tube. This mixture is cooled in a bath of carbon dioxide snow and acetone, and 69 g of sodium (3 gram atoms) cut into thin slices is gradually added. After the metal has dissolved, 127 g (1 mole + 5% excess) of freshly distilled allyl bromide diluted with 200 ml of diethyl ether is introduced. After stirring for 20 minutes, the reaction mixture gives a negative thiol reaction (nitroprusside). The ammonia is removed by bubbling a stream of nitrogen through the reaction mixture and the last traces of ammonia are removed under reduced pressure. The powdery residue is dissolved in 300 ml of iced water. The solution obtained is filtered through a glass frit, is thrice extracted with diethyl ether and the pH is then brought to 6.4 with concentrated hydrochloric acid. The precipitate is filtered and is recrystallised from a mixture of 9 parts of water and 1 part of ethanol. The mother liquors are evaporated to dryness and the residue recrystallised in the same way after treatment with "Norit" decolorising carbon. 151 g (yield 94%) of product are obtained. M.pt. = 236°C (decomp.) (Buchi). Isoelectric point = 6.42. Rotation: $(\alpha)_D^{20} = -10°$ (5 percent solution in water).

Analysis

The calculated and found values for $C_6H_{11}O_2NS$ are:

C % calculated 44.70; found: 44.79

H % calculated 6.87; found: 6.96
N % calculated 8.68; found: 8.76
S % calculated 19.88; found: 19.81

Second Method 43.9 g (0.25 mole) of cysteine hydrochloride monohydrate is dissolved in 362 ml of distilled water. This mixture is cooled to 0°C and a solution containing 20.3 g (0.5075 mole, 1.5 percent excess) of sodium hydroxide in 100 ml of water is added, followed by 35 g (0.292 mole, 16.8 percent excess) of freshly distilled allyl bromide dissolved in 25 ml of distilled acetonitrile. After 5 to 20 minutes, the reaction mixture gives a negative reaction to nitroprusside.

The solution is brought to pH 6.4 with concentrated hydrochloric acid and the subsequent procedure is as described in the preceding Example. 24 g (yield 60%) of product are obtained. M.pt. = 234°C. Isoelectric point = 6.4. Rotation: $(\alpha)_D^{20} = 11.04°$ (5% solution in water).

The mother liquors still contain some product which may be recovered.

Analysis

The calculated and found values for $C_6H_{11}O_2NS$ are:
C % calculated: 44.70; found: 44.79
H % calculated: 6.87; found: 6.96
N % calculated: 8.68; found: 8.76

Third Method 25 ml of 4N caustic soda and 12.1 g (1.5 g excess) freshly distilled allyl bromide diluted with 25 ml of ethyl ether are added, simultaneously and at 0°C, to 17.55 g (0.1 mole) of cysteine hydrochloride monohydrate and 50 ml (0.2 mole) of 4N caustic soda.

After 1 hour, the reaction mixture was free from thiol groups (nitroprusside reaction).

The mixture is then thrice extracted with diethyl ether and the pH brought to 6.5 with concentrated hydrochloric acid.

The product is purified as described in Method 1 of Example 2.

11.1 g (yield 69%) of product is obtained. M.pt. = 235° – 236°C (decomp.) (Buchi). Rotation: $(\alpha)_D^{20} = -10.2°$ (5 percent solution in water).

Analysis

The calculated and found values for $C_6H_{11}O_2NS$ are:
C % calculated 44.70; found: 44.76
H % calculated 6.87; found: 6.81
N % calculated 8.68; found: 8.67
Molecular weight = 161.22

PREPARATION 3:

S-allylcysteine sulphoxide (LJ 154).

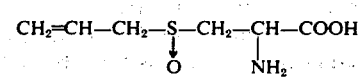

15 g (0.217 mole) of S-allylcysteine is dissolved in 300 ml of distilled water. The solution is cooled to 0°C and 26.5 ml of 32.7% hydrogen peroxide is added during the course of 8 hours with continuous stirring. After the addition, the mixture is kept at 25°C for 18 hrs. The solution is evaporated under reduced pressure (15 mm of mercury) to 70 ml. The residue solidifies on addition of alcohol and diethyl ether. 36 g (yield 75%) of product are obtained. M.pt. = 147° – 148°C. Rotation: $(\alpha)_D^{22} = -17.5°$ (5% solution in water).

Analysis

The calculated and found values for $C_6H_{11}O_3NS$, 0.5 $H_2O$ are:
C % calculated 38.70; found: 38.98
H % calculated 6.49; found: 6.27
N % calculated 17.52; found: 7.64
S % calculated 17.21; found: 17.11

TLC upon silica gel using a mixture of 70% n-propanol, 10% ammonium hydroxide and 20% of water shows that the product forms only a single spot.

PREPARATION 4:

L β-(propen-2-ylthio) α-formanidopropanoic acid or N formyl-S-allylcysteine (LJ 559).

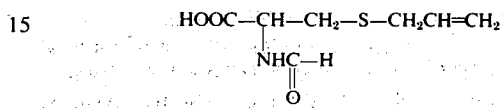

9.66 g (0.06 mole) of S-allylcysteine is dissolved in 100 ml of formic acid together with 4.50 g (0.066 mole) of sodium formate and 33 ml of acetic anhydride. The mixture is stirred for 1 hour and allowed to stand overnight at ambient temperature. It is evaporated to dryness under reduced pressure and recrystallised from 30 ml of distilled water. 8 g (yield 70%) of product are obtained. Some product remains in the mother liquors. M.pt. = 138°C (Buchi). Rotation: $(\alpha)_D^{22} = +7.5°$ (2.5% solution in ethyl alcohol).

Analysis

The calculated and found values for $C_7H_{11}NO_3S$ are:
C % calculated 44.44; found: 44.36
H % calculated 5.85; found: 6.00
N % calculated found: 7.40; found: 7.39
S % calculated 16.93; found: 16.65

TLC up on silica gel reveals that the product forms only a single spot. $R_f = 0.84$. (Solvent: 45% of n-butanol, 15% acetone, 10% acetic aid and 20% water).

The infrared spectrum reveals the presence of a double bond at 934 $cm^{-1}$.

PREPARATION 5:

L β-(propen-2-ylthio) α-acetamidopropanoic acid or L S-allyl-N-acetylcysteine (LJ 560).

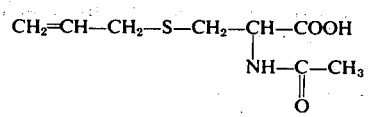

30 ml of acetic anhydride is added to a suspension of 9.66 g (0.06 mole) of S-allyl cysteine in 30 of water at 0°C. The mixture is warmed to 30°C and stirring continued for 3 hours at ambient temperature. The solution is evaporated to dryness under reduced pressure. The residue is washed with 30 ml of iced water, filtered, and recrystallised from 20 ml of distilled water.

Acetylation may also be carried out with acetic anhydride.

9.3 g (yield 76%) of product is obtained. M.pt = 123°C. Rotation: $(\alpha)_D^{22} = -23°$ (5% solution in ethyl alcohol).

Analysis

The calculated and found values for $C_8H_{13}O_3NS$ are:
C % calculated 47.27; found: 47.24
H % calculated 6.44; found: 6.51
N % calculated 6.89; found: 6.90
S % calculated 15.76; found: 15.79

TLC shows that the product forms only a single spot. $R_f = 0.87$ (using the same solvent as in the preceding Example). The infra-red spectrum reveals the presence of a double bond at 934 cm$^{-1}$.

PREPARATION 6:

L β-(propen-1-ylthio) α-aminopropanoic acid or S-(propen-1-yl)cysteine (LJ 557).

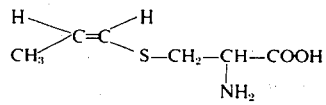

20 g of sodium is added to 400 ml of ethanol. After the metal has dissolved, the solution is evaporated to dryness. The sodium ethylate is dissolved in 1200 ml of anhydrous dimethyl formamide. 93.2 g (0.58 mole) of S-allylcysteine is then added and the mixture heated at 60°C until solution occurs. The mixture is then allowed to stand at ambient temperature for 20 hours whilst being stirred. Approximately 5 g of precipitate is removed by filtering. The filtrate is evaporated to dryness under reduced pressure. 400 g of crushed ice is added and the pH is brought to 6 by adding hydrochloric acid. The product which is separated by filtration is recrystallised from boiling water in the presence of activated carbon. 45.7 g (yield = 49%) of product is collecterd. M.pt = 180.3°C. Isoelectric point = 6.00. Rotation: $(\alpha)_D^{22} = +14.2°$ (0.8% solution in water).

Analysis

The calculated and found values for $C_6H_{13}O_3NS$ are:
C % calculated 44.70; found 44.79
H % calculated 6.87; found 6.96
N % calculated 8.68; found 8.76
S % calculated 19.88; found 19.81

TLC shows that the product forms only a single spot. $R_f = 0.57$ (same solvent as that used in the preceding Example).

PREPARATION 7:

L β-(buten-2-ylthio) α-aminopropanoic acid or S-(buten-2-yl)cysteine (LJ 549).

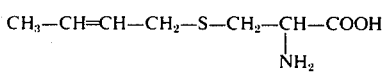

175.5 g of cysteine hydrochloride monohydrate and then 69 g of sodium cut into slices are added in small portions to 1800 ml of liquid ammonia while stirring. After the metal has dissolved 135 g (1.07 mole, 10 g excess) of crotonyl bromide dissolved in 200 ml of diethyl ether is gradually added. When the absence of thiol groups is indicated (nitroprusside reaction) the ammonia is removed. The residue is dissolved in 400 ml of iced water, filtered, and extracted with diethyl ether in order to remove the excess of crotonyl bromide. The aqueous solution is brought to pH by 7 by adding concentrated hydrochloric acid. The product is filtered and recrystallised from water. 140 g (yield 80%) of product is obtained. M.pt = 226° - 226.5°C (Buchi). Isoelectric point = 5.2. Rotation: $(\alpha)_D^{22} = -9.5°$ (2% solution in water).

Analysis

The calculated and found values for $C_7H_{13}O_2NS$ are:
C % calculated 47.97; found: 48.00
H % calculated 7.48; found: 7.59
N % calculated 7.99; found: 7.97
S % calculated 18.29; found: 18.64

TLC shows that the product forms only a single spot. $R_f = 0.53$.

PREPARATION 8:

L β-(propyn-2-ylthio)α-aminopropanoic acid or s-proparglycysteine (LJ 525).

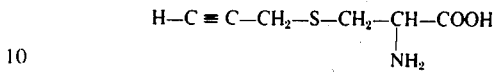

62.5 g (0.4 mole) of anhydrous cysteine hydrochloride and then 28 g (1.22 gram atoms) of sodium in thin slices are gradually added to 500 ml of liquid ammonia. 48 g (0.4 mole) of redistilled propargyl bromide is added to this mixture and the subsequent procedure is then as described in the foregoing Examples.

The aqueous solution of the compound is brought to pH 6.5 and the product is filtered and purified by being dissolved in 4N ammonium hydroxide and reprecipitated with the aid of 4N hydrochloric acid. It is finally recrystallised from boiling water in the presence of active carbon. 39.2 g (yield 62%) of product is obtained. M.pt = 179° - 180°C. Rotation: $(\alpha)_D^{22} = -67°$ (1% solution in water).

Analysis

The calculated and found values for $C_6H_9O_2NS$ are:
C % calculated 45.26; found: 44.97
H % calculated 5.69; found: 5.73
N % calculated 8.80; found: 8.54
S % calculated 20.13; found: 19.91

TLC shows that the product forms only a single spot $R_f = 0.47$.

PREPARATION 9:

S-methyl-cysteine (LJ 106).

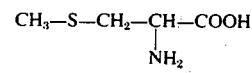

This compound was prepared as described in Example 2 from 17.55 g (0.1 mole) of cysteine hydrochloride monohydrate and 9.5 g (1.5 g excess) of methyl bromide. 9.3 g (yield = 69%) of product is obtained. M.pt = 248° - 249°C. Rotation: $(\alpha)_D^{22} = -33.8°$ (5% solution in water).

Analysis

The calculated and found values for $C_4H_9NSO_2$ are
C % calculated 35.54; found 35.44
H % calculated 6.71; found 6.78
N % calculated 10.36; found 10.31
S % calculated 23.72; found 23.70

PREPARATION 10:

S-ethyl cysteine (LJ 81)

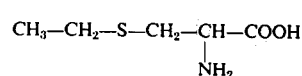

This compound is prepared in the same way as the S-methyl compound from 17.55 g (0.1 mole) of cysteine hydrochloride monohydrate and 13 g (0.1 mole + excess) of ethyl bromide. The yield is 75%. M.pt. = 254° - 256°C. Rotation: $(\alpha)_D^{22} = -22.2°$ (2 percent solution in water).

Analysis

The calculated and found values for $C_5H_{11}O_2NS$ are:

C % calculated 40.25; found: 40.19
H % calculated 7.43; found: 7.44
N % calculated 9.38; found: 9.31 - 9.43
S % calculated 21.48; found: 21.32

PREPARATION 11:

S-benzyl cysteine (LJ 55)

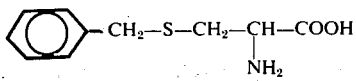

This compound is prepared from 35.1 g (0.2 mole) cysteine hydrochloride monohydrate and 25.6 g (0.2 mole + excess) of benzyl bromide. 34 g (yield = 81%) product is obtained. Melting point = 211°C.

Analysis

The calculated and found values for $C_{10}H_{13}O_2NS$ are
C % calculated 56.85; found 56.82
H % calculated 6.20; found 6.27
N % calculated 6.62; found 6.75
S % calculated 15.17; found 15.06

PREPARATION 12:

L β-(p-chlorobenzylthio) α-aminopropanoic acid or S-(p-chlorobenzyl)cysteine (LJ 526).

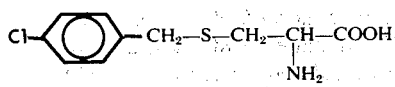

63 g (0.4 mole) of anhydrous cysteine hydrochloride, 28 g (1.23 gram atom) of sodium, and 65 g (0.40 mole) of p-chlorobenzyl chloride diluted with 100 ml of diethyl ether are added to 900 ml of ammonia. After the thiol compound has disappeared, the ammonia is removed and the residue washed first with 96 percent alcohol and then with water. The product is centrifuged and purified by being dissolved in 4N ammonium hydroxide and precipitated with 5N hydrochloric acid. 76.6 g (yield 66.5%) of product is finally obtained. M.pt. = 207.5°C.

Analysis

The calculated and found values for $C_{10}H_{12}O_2NSCl$, 0.5 $H_2O$ are:
C % calculated 47.15; found: 47.00
H % calculated 5.14; found: 4.76
N % calculated 5.49; found: 5.22

TLC shows a single spot. $R_f$ = 0.54 (using the same solvent as that used in Example 4).

The compounds were subjected to pharmacological testing, the results of which are given below.

In copending U.S. application No. 365,499 (atty. No. 110-199-73167), filed May 31, 1973 by the present applicants (corresponding to French patent application N. 72-21364, filed June 14, 1972) is described "Compound LJ 537," which is N-(3-methyl-4-phenylbuten-3-oyl)glucosamine:

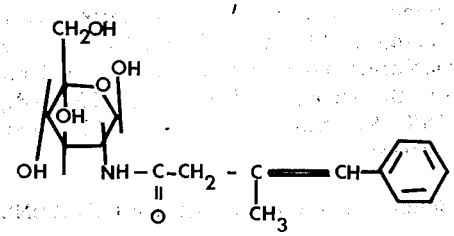

The synthetic route for preparation of compound LJ 537 is described in said copending U.S. application as follows:

a. 3-benzylidene butyryl chloride 73 g (0.415 mole) of α-benzalbutyric acid are added to 55 cm³ of thionyl chloride which has been distilled from a linseed oil bath and diluted with 430 cm³ of anhydrous benzene. The mixture is refluxed for 3 hours and the excess of thionyl chloride and the solvent are then removed under reduced pressure (15 mm). The residue is dissolved in 200 cm³ of anhydrous benzene and treated with active carbon. After filtering, the benzene is removed under reduced pressure and the residue is heated for 2 minutes on a water bath at 100°C at a pressure of 0.5 mm of mercury. The product obtained is sufficiently pure for the next step in the process. (It may however be distilled)

Boiling point: 103°–105°C/0.3 to 0.5 mm, but there is a tendency to polymerise.

b. 3-benzylidene butyric acid anhydride 97.25 g (0.5 mole) of 3-benzylidenebutyryl chloride diluted with 200 cm³ of anhydrous benzene is added to a suspension in benzene of 99 g (0.5 mole) of the sodium salt of 3-benzylidene butyric acid whilst stirring. The temperature rises by 8°C. Stirring is continued at room temperature for 2½ hours and the mixture is then left to stand overnight. The sodium chloride formed is removed by filtering or centrifuging and the solvent is removed under reduced pressure. The residue solidifies after several days.

Weight of product: 151 g Yield: 90.6% c. N-(3-Methyl-4-phenylbuten-3-oylglucosamine 135 g (0.405 mole) of the anhydride prepared as described under (b) is added to a suspension of 72.5 g (0.405 mole) of glucosamine base in 630 cm³ of anhydrous methanol whilst the temperature is held in the region of 30°C. Stirring is continued for 1 hour at room temperature. The mixture is filtered, washed with methanol, and then three times with ether. 115 g of product are finally obtained.

Yield: 84.5% M.pt. (Buchi): 114°–115°C

Rotation: $(OC)_D^{23}$: + 20.7
(Concentration: 2.5% in dimethylformamide)

Analysis

The calculated and found values for $C_{17}H_{23}O_6N$, are
C % calculated: 60.56% Found: 60.40%
H % calculated: 6.88% Found: 6.80%
N % calculated: 4.15% Found: 4.08%

Thin-layer chromatography using silica gel (solvent: methanol) shows that the product forms only a single spot.

A mixture of compound LJ 84 and compound LJ 537 has proved to be extremely interesting from the therapeutic point of view and has also been subjected to pharmacological tests.

1. Toxicity

The maximum tolerated doses (MTD) after oral administration were established for the mouse and are given below in Table 1.

TABLE 1

| Compound | MTD |
|---|---|
| LJ 84 | ≥ 10 g/kg |
| LJ 84 + LJ 537 (1/1 parts by weight) | ≥ 5 g/kg |
| LJ 557 | ≥ 10 g/kg |
| LJ 554 | ≥ 10 g/kg |
| LJ 549 | 5 g/kg |
| LJ 559 | 5 g/kg |
| LJ 560 | 5 g/kg |
| LJ 525 | 0.200 g/kg |
| LJ 526 | 4 g/kg |
| LJ 106 | 3 g/kg |
| LJ 55 | 4.5 g/kg |
| LJ 81 | >5 g/kg |
| LJ 154 | >5 g/kg |

2. Effect on atheromatous deposits in the aorta and on plasma cholesterol in the rabbit In order to produce atheromatous lesions experimentally, male albino Bouscat rabbits having an average weight of 2.5 kg are fed on a Provende UAR rabbit diet plus 1 or 2% of cholesterol.

At the end of 11 to 12 weeks, the animals are sacrificed by cutting the carotid artery after they have been anaesthetised with Nembutal and the aorta is removed from its lowermost point as far as the iliac fork, is cut open longitudinally and spread out upon a cork board. After being fixed with formaldehyde and staining with a 2% aqueous solution of acid fuchsin, pearly white atheromatous patches become apparent against the red background, which enables the extent of the deposits to be established quantitatively on a scale from 0 to 5 with 0 corresponding to the absence of lesions and 5 corresponding to diffuse lipid deposits covering the whole of the endothelium.

After separating the inside layers of the wall of the aorta, all the lipids are extracted by the method of Folch et al. (J. Biol. Chem. (1957), volume 226, pages 497 to 509). The amount of cholesterol is then determined by the Liebermann-Burchard method.

Moreover, a check on the plasma cholesterol is carried out at regular intervals during the test using the method of Pearson et al. (Anal. Chem. (1953), vol. 25, p 813), as adapted to the Technicon auto-analyser by Boy, Bonnafe and Mazet (Ann. Biol. Clin. 1960, Nos. 10–12) and by Renault and Etienne (Ann. Biol. Clin. (1963), volume 21, Nos. 10–12).

In a first test, 50 male rabbits each of 2.5 kg weight were fed on the diet given below:

| | |
|---|---|
| 5 weeks | diet with 2% added cholesterol |
| 3 weeks | diet with 1% added cholesterol |
| 4 weeks | normal diet. |

From the beginning the animals were divided into five batches of 20 animals which, for the whole duration of the diet, received respectively, on 5 days per week, the following products, which were administered by the digestive route using an oesophagel probe:

| | |
|---|---|
| Batch 1 | a 10% suspension of gum arabic |
| Batch 2 | 200 mg per kg of LJ 84 (2-propenyl cysteine) |
| Batch 3 | 200 mg per kg of LJ 557 (1-propenyl cysteine) |
| Batch 4 | 200 mg per kg of LJ 554 [S-(3-hydroxypropyl) cysteine] |
| Batch 5 | 200 mg per kg of LJ 549 [S-(2-butenyl) cysteine] |

All the products were in suspension in the same volume of gum arabic (5 ml).

At the end of the twelfth week, visual examination of the atheromatous lesions in the aorta gave the results shown in Table 2. The numerical data gives the average extent of deposit in each batch. The aortic and plasmatic cholesterol concentrations are also given in Table 2.

TABLE II

| | Extent of atheromatous deposit | Aortic cholesterol mg/kg | Plasma cholesterol ml/1000 at sacrifice |
|---|---|---|---|
| Diet alone | 3.5 | 20.43 | 1.47 |
| LJ 84 | 1.75 | 9.62 | 0.92 |
| LJ 557 | 1.90 | 10.80 | 0.92 |
| LJ 554 | 2.20 | 13.5 | 1.25 |
| LJ 549 | 2.50 | 13.9 | 1.24 |

Using the same experimental procedure, the following 8 derivatives, as well as a mixture of the two compounds LJ 84 and LJ 537, were studied in a second test:

| | |
|---|---|
| Batch 1 | a 10% suspension of gum arabic |
| Batch 2 | 200 mg/kg of LJ 84 + 100 mg/kg of LJ 537 |
| Batch 3 | 200 mg/kg of LJ 559 (N-formyl-S-allylcysteine) |
| Batch 4 | 200 mg/kg of LJ 560 (N-acetyl-S-allylcysteine) |
| Batch 5 | 5 mg/kg of LJ 525 (S-propargylcysteine) |
| Batch 6 | 200 mg/kg of LJ 526 (S-chlorobenzylcysteine) |
| Batch 7 | 100 mg/kg of LJ 106 (S-methylcysteine) |
| Batch 8 | 200 mg/kg of LJ 55 (S-benzylcysteine) |
| Batch 9 | 200 mg/kg of LJ 81 (S-ethylcysteine) |
| Batch 10 | 200 mg/kg of LJ 154 (S-allylcysteine sulphoxide) |

The results are given in Table III:

TABLE III

| | Extent of atheromatous deposit | Aortic cholesterol mg/kg | Plasma cholesterol at sacrifice ml/1000 |
|---|---|---|---|
| Diet alone | 4 | 22.1 | 2.5 |
| Mixture of LJ 84 + LJ 537 | 1.2 | 9.2 | 2.4 |
| LJ 154 | 2 | 12.4 | 2.3 |
| LJ 559 | 2.8 | 16.2 | 2.4 |
| LJ 81 | 3 | 16.8 | 2.5 |
| LJ 560 | 3.1 | 16.8 | 2.6 |
| LJ 55 | 3.4 | 17.3 | 2.6 |
| LJ 106 | 3.4 | 18.1 | 2.7 |
| LJ 525 | 3.6 | 19 | 2 |
| LJ 526 | 2.6 | 15 | 2.1 |

CONCLUSIONS

With the mixture of LJ 84 and LJ 537, and with all these derivatives of cysteine, there is observed on the one hand a reduction in atheromatous deposits, which is revealed both visually and biochemically, and, on the other hand, a reduction in hypercholesterolemia.

Compounds LJ 84, LJ 557 and LJ 154 and the mixture of the two compounds LJ 84 and LJ 537 are the most active. The mixture is preferably used in the proportion of 2 parts by weight of LJ 84 to one part of LJ 537.

The cysteine derivatives used in accordance with the present invention may, consequently, be used as active principles in medicines. such medicines, depending upon the route by which they are to be administered, ill contain one or more of the conventional pharmacologically acceptable adjuvents, such as diluents, excipients and lubricants.

They may be administered to human beings in doses from 200 mg to 3 g per day, preferably of 800 mg per day.

The following are examples of pharmaceutical compositions in accordance with the invention.

Examples 1 – 4
Lozenge Tablets

| | |
|---|---|
| LJ 84 | 0.200 g |
| Colloidal silica | 0.020 g |
| Lactose | 0.080 g |
| Excipient q.s for a tablet | |
| LJ 84 | 0.100 g |
| LJ 537 | 0.100 g |
| Colloidal silica | 0.020 g |
| Lactose | 0.080 g |
| | 0.300 g |
| LJ 106 | 0.250 g |
| Colloidal silica | 0.025 g |
| Lactose | 0.055 g |
| Stearic acid | 0.020 g |
| | 0.350 g |
| LJ 154 | 0.200 g |
| Colloidal silica | 0.010 g |
| Microcrystalline cellulose | 0.085 g |
| Magnesium stearate | 0.005 g |
| | 0.300 g |

Example 5
Capsule

| | |
|---|---|
| LJ 154 | 0.250 g |
| Colloidal silica | 0.010 g |
| Talc | 0.010 g |
| | 0.270 g |

Examples 6 – 8
Intravenously Injectable Solutions

| | |
|---|---|
| LJ 84 | 0.250 g |
| Sodium bicarbonate to give pH 6.8 | 0.020 g |
| Sodium chloride | 0.050 g |
| Distilled water to make 10 ml | |
| LJ 84 | 0.100 g |
| LJ 537 | 0.100 g |
| Sodium chloride | 0.050 g |
| Sodium bicarbonate to give pH 6.8 | |
| Distilled water to make 10 ml | |
| LJ 106 | 0.100 g |
| Sodium bicarbonate to give pH 6.8 | |
| Distilled water to make 10 ml | |

The compositions containing cysteine derivatives described herein may be used to treat the following complaints:

1. all atheromatic complications: coronary dificiencies arterial diseases of the lower limbs cerebral vascular deficiencies (softening, strokes) arterial hypertension vascular nephropathy vascular retinopathy
2. Disorders of the lipid metabolism: hypercholesterolemia hypertriglyceridemia and hyperlipidemia
3. Damage to the basic tissue: arthrosis bone disease and non-arteriomatic arterial disease
4. and possibly cicatrization disorders, fibrosis and collagenosis
5. Enzyme diseases with pathological amino-aciduria homocysteinemia.

We claim:

1. A pharmaceutical composition for use in securing a reduction in atheromatous deposits and hypercholesteroloma which comprises a mixture of L S-allyl cysteine and β-benzylidenebutyrylglucosamine and a pharmaceutical diluent.

2. A composition according to claim 1 in which said mixture consists of substantially two parts by weight of S-allyl cysteine for each part of β-benzylidenebutyrylglucosamine.

3. The method of reducing atheromatic deposits and plasma cholesterol levels in a patient suffering from an atheromatic disease or a disorder of the lipid metabolism which comprises administering to said patient a daily dose of from 200 mg to 3.0 gram of an L S-substituted cysteine selected from the group consisting of L S-(3-hydroxypropyl)cysteine, L S-allyl cysteine, L S-allyl cysteine sulphoxide, L S-allyl-N-formylcysteine, L S-allyl-N-acetylcysteine, L S-propargyl cysteine, L S-methyl cysteine, L S-ethylcysteine, L S-benzylcysteine and L S-(parachlorobenzyl)cysteine.

4. The method claimed in claim 3 in which said daily dose is 800 mg of said L S-substituted cysteine.

5. The method of claim 3 in which said cysteine is L S-allyl cysteine and it is used admixed with β-benzylidenebutyrylglucosamine.

6. The method of claim 5 in which said mixture consists of substantially two parts by weight of S-allyl cysteine for each part of β-benzylidenebutyrylglucosamine.

7. A method of claim 3 wherein said cysteine is L-S-allylcysteine.

* * * * *